United States Patent [19]

McGirr et al.

[11] Patent Number: 5,736,937

[45] Date of Patent: Apr. 7, 1998

[54] APPARATUS FOR WIRELESS TRANSMISSION OF SHAFT POSITION INFORMATION

[75] Inventors: Andrew McGirr; Murray Tough; Dave Goulbourne; Dave Jessee, all of Calgary, Canada

[73] Assignees: Beta Monitors & Controls, Ltd.; Murandi Communications Ltd., both of Calgary, Canada

[21] Appl. No.: 527,232

[22] Filed: Sep. 12, 1995

[51] Int. Cl.[6] .................................................. G08B 21/00
[52] U.S. Cl. ............................. 340/870.16; 340/870.3; 73/119 R; 324/402
[58] Field of Search ................ 340/870.16, 870.05, 340/870.08, 870.19, 870.21, 870.3, 870.31, 870.28, 870.29; 73/119 R; 324/378, 379, 402

[56] References Cited

U.S. PATENT DOCUMENTS

| | | | |
|---|---|---|---|
| 2,907,991 | 10/1959 | Van Allen | 340/207 |
| 4,011,551 | 3/1977 | Adler | 340/189 M |
| 4,076,039 | 2/1978 | Hartsock | 137/344 |
| 4,242,666 | 12/1980 | Reschovsky et al. | 340/870.28 |
| 4,404,559 | 9/1983 | Renner | 340/870.28 |
| 4,408,204 | 10/1983 | Salvesen | 340/870.24 |
| 4,518,962 | 5/1985 | Imose et al. | 340/870.28 |
| 4,573,048 | 2/1986 | Dash | 340/870.37 |
| 5,019,814 | 5/1991 | Biggs et al. | 340/870.29 |
| 5,151,695 | 9/1992 | Rollwitz et al. | 340/870.3 |
| 5,170,161 | 12/1992 | Sakurai | 340/870.3 |
| 5,293,776 | 3/1994 | Takegami et al. | 340/870.31 |

OTHER PUBLICATIONS

Product Information Sheet for Beta's Remote-Link Beta Monitors & Controls Ltd., 1 page.

"Tech Note", Product Information Sheet for Beta-Link, Beta Monitors & Controls Ltd., 2 pages.

Primary Examiner—Jeffery Hofsass
Assistant Examiner—Andrew Hill
Attorney, Agent, or Firm—Panitch Schwarze Jacobs & Nadel, P.C.

[57] ABSTRACT

An apparatus for reliably conveying real time shaft position information, without cables, between a stationary sensor connected to a reciprocating engine or compressor, or other rotating machinery, and an engine analyzer, in the presence of high energy ignition voltages employs a combination of conventional and non-conventional radio frequency technologies and digital signal processing to both encode and accurately reproduce real time shaft position information. The apparatus provides a safer and more efficient method for an engine maintenance technician to make predictive maintenance measurements on reciprocating engines.

21 Claims, 3 Drawing Sheets

APPARATUS FOR WIRELESS TRANSMISSION OF SHAFT POSITION INFORMATION

FIELD OF THE INVENTION

The present invention generally relates to the wireless transmission of electrical signals and more particularly, to the wireless transmission of shaft position information in the presence of high voltage electromagnetic impulses.

BACKGROUND OF THE INVENTION

Large reciprocating engine failures can be dangerous as well as expensive. Predictive maintenance is essential for the early detection of potential failures and for taking preventive action before a large and expensive repair bill or injury results. Current technology employs a position sensor connected to the rotating engine's shaft and connected through a long, shielded cable to a remotely located engine analyzer. The engine analyzer has several probes which measure gas pressure, vibration, and other vital engine parameters.

For the engine maintenance technician taking predictive maintenance measurements on a large reciprocating engine or compressor, the connecting cable represents a nuisance as well as a safety hazard. The technician must often ascend steps, cat walks, or the like and drag the cable (75 feet), often through oil and other potential hazardous contaminants. As well as the risk of injury from the cable catching on rotating machinery, the steps, cat walk, or engine peripherals, there is the inconvenience from the cables frequently breaking. It is also desirable for the engine maintenance technician to be able to move freely about while making measurements. A wireless shaft position sensor would allow the technician to make measurements quickly, efficiently, and safely.

However, the large reciprocating engine environment is not conducive to wireless sensor transmission. Large engine ignition systems produce a repetitive stream of sub-nanosecond electrical impulses, some with amplitudes in excess of 50,000 volts. The electromagnetic spectrum occupied by such impulses extends from several Hz to many GHz. Accordingly, the magnitude of the interference resulting from such impulses is such that most analog and digital equipment cannot be reliably operated, and often won't operate at all, in the vicinity of many of these engines. Further complicating signal transmission, such engines are often located outdoors or in large steel buildings with many metal and other obstructions making the use of infrared signal transmission impractical.

Prior attempts to construct a wireless link for transmitting engine predictive maintenance data using conventional technology have failed. Even if a carefully designed conventional radio link could be made to operate in the large engine environment, the magnitude of the radio link interference would be so severe that the reliable operating range of a low power link would not be large enough to be practical.

Even further, in order to perform detailed engine analysis, sensors located proximate to the engine must provide detailed information. For instance, for a rotating device, both once per revolution and "n" per degree shaft revolution data is generally required.

The present invention provides a method and apparatus for the wireless transmission of shaft position information in the presence of electromagnetic interference from high voltage ignition systems. Several techniques are employed to overcome the overwhelming radio interference while preserving accurate and reliable real-time data transfer, at engine speeds ranging from 15 to 2400 rpm, including the use of band limited antennas, wide band frequency shift keying (FSK) and baseband filtering to reduce the impact of the high levels of interference from the high voltage ignition systems and the effects of the radio signal fading inherent in the operating environment. Digital signal processing techniques are also used, including a combination of filtering in both the frequency and time domains predicated on constantly updated predictions of engine rotation characteristics and ignition pulses in order to overcome and/or correct errors. In addition, the present invention multiplexes data signals and then simultaneously transmits the data over a single radio frequency channel.

SUMMARY OF THE INVENTION

Briefly stated, the present invention is a radio frequency (RF) apparatus for transmitting real-time shaft position information over an RF channel between at least one stationary sensor located proximate to a rotating machine and a receiver spaced from the sensor, in the presence of high voltage electromagnetic impulses. The at least one sensor monitors a rotating shaft of the rotating machine and generates a once per revolution analog signal and an "n" per degree analog signal. The RF apparatus comprises: (a) a transmitter for processing and transmitting the signals generated by the at least one sensor; and (b) a receiver spaced from the transmitter for receiving, demodulating and reconstructing the transmitted signals. The transmitter comprises: (1) a threshold detection circuit for converting the analog signals to corresponding digital logic signal levels; (2) a multiplexer for combining the once per revolution and n per degree digital signals into a single, multiplexed transmit data signal representing the once per revolution signal and the n per degree signal; (3) a modulator for frequency modulating a radio frequency signal with the transmit data signal; and (4) a band limited antenna electrically coupled to the transmitter for radiating the modulated radio frequency signal. The receiver spaced from the transmitter comprises: (1) an antenna for receiving the signal radiated by the transmitter; (2) a receiver circuit electrically coupled to the receiver antenna for selecting and demodulating the received signal; and (3) a signal processor for interpreting and reconstructing the once per revolution and n per degree digital signals from the demodulated received signal.

The invention further comprises a method for transmitting shaft position information from a sensor located proximate to an engine to a receiver spaced from the sensor, in the presence of high voltage electromagnetic impulses. The method comprises the steps of: (a) the sensor monitoring a rotating shaft of the engine and generating a once per revolution analog signal and an n per degree analog signal; (b) converting the analog signals to corresponding digital signal levels; (c) combining the digital signals into a single, transmit data signal representing the once per revolution signal and the n per degree signal; (d) modulating a radio frequency carrier with the transmit data signal; (e) transmitting the modulated signal over an RF channel; (f) receiving the transmitted signal at the receiver; (g) demodulating the received signal; and (h) demultiplexing and reconstructing the once per revolution and n per degree digital signals therefrom.

BRIEF DESCRIPTION OF THE DRAWINGS

The foregoing summary, as well as the following detailed description of preferred embodiments of the present invention, will be better understood when read in conjunction with the appended drawings. For the purpose of illustrating the present invention, there is shown in the drawings embodiments which are presently preferred. It should be understood, however, that the present invention is not limited to the particular arrangements and instrumentalities shown. In the drawings.

DETAILED DESCRIPTION OF THE PREFERRED EMBODIMENT

Certain terminology is used in the following description for convenience only and is not limiting. The word "major" is used synonymously with once per revolution and normally indicates the top dead center position of an engine shaft and "minor" is used synonymously with n per degree and normally indicates the degree of rotation of the engine shaft. The term once per revolution refers to a signal pulse generated by a sensor once per revolution of a shaft. The term n per degree refers to the signal pulses generated by a sensor during each shaft revolution, where "n" indicates the number of pulses generated per degrees of rotation. The term pulse is used to refer to an electrical signal. The terminology includes the words above specifically mentioned, derivatives thereof and words of similar import.

The present invention is directed to a radio frequency (RF) apparatus for transmitting shaft (such as an engine crankshaft) position information between a sensor located proximate to a reciprocating engine or device and a receiver, such as a stationary or portable engine analyzer. The RF apparatus eliminates the requirement for a long, shielded synchronizing cable presently used to connect an engine analyzer with engine mounted sensors. The RF apparatus includes digital signal processing circuitry in order to overcome the noise and signal interference present in an industrial environment in which large reciprocating engines operate.

Figure 1:
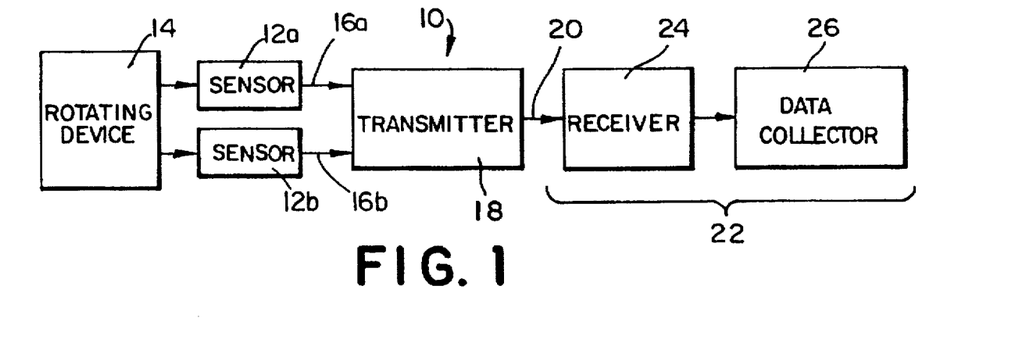
FIG. 1 is a high level schematic block diagram of a wireless shaft position sensor apparatus in accordance with a preferred embodiment of the present invention.

Referring now to the drawings in detail, FIG. 1 is a schematic block diagram of an RF apparatus 10 in accordance with a preferred embodiment of the present invention. In the schematic block diagrams shown, it will be understood by those of ordinary skill in the art, that lines connecting functional blocks do not necessarily represent a wire or conductor, but represent a signal or signals which are either inputs or outputs of the particular functional block. To collect shaft position information, at least one shaft position sensor 12a is connected to a large reciprocating engine or rotating device 14 under test. The sensor 12a may be either permanently or temporarily located proximate to the engine or device 14 and is used to monitor shaft rotation and generate a once per revolution electrical output signal or pulse 16a. The sensor 12a may be of any known type, such as a Hall effect transducer, a magnetic pickup, an optical sensor, or the like. These types of sensors, in and of themselves, are generally known by those of ordinary skill in the art and are readily commercially available. Accordingly, further description of such sensors is not provided, since it is not required for a complete understanding of the present invention.

For certain applications and engine measurements, more detailed information or data is required than a once per revolution signal. Accordingly, a second sensor 12b may be connected to the engine or device 14 for generating an "n" per degree electrical output signal 16b. That is, for every one degree of rotation of the engine shaft, the second sensor 12b generates "n" electrical pulses. For example, for n equal to 1, the second sensor 12b produces 360 pulses per revolution. In the type of engine or device 14 generally monitored using the present invention, the number of revolutions per minute ranges from 15 to 2400 rpm, and thus (with n=1), the second sensor 12b produces from 90 to 14,400 pulses per second. It will be understood by those of ordinary skill in the art that the second sensor 12b is used for generating multiple pulses, in even increments, throughout a revolution, where "n" equals the number of pulses generated per degree of rotation, and that "n" may be a fraction or a whole number. The second sensor 12b, like the sensor 12a, may be a Hall effect type transducer, a magnetic pickup, an optical pickup or similar type angular position sensor. Again, the specific types of sensors 12a or 12b used with the present invention are generally known and commonly available, and therefore, further details of the structure and operation of such sensors are not required to understand the present invention.

Note that a single sensor could be provided which is capable of producing both a once per revolution signal and an n per degree signal. In the presently preferred embodiment, both the once per revolution signal 16a and the n per degree signal 16b are generated from a single sensor unit, which is commonly available, called an encoder. It is understood that the sensors 12a, 12b, or an encoder may be either permanently or temporarily installed on the engine or device 14.

In the presently preferred embodiment, a short, shielded cable or conductor connects each of the sensors 12a, 12b to a transmitter 18 for electrically coupling the sensors 12a, 12b to the transmitter 18 for transmitting the electrical output signals 16a, 16b to the transmitter 18. The transmitter 18 processes, combines and transmits both the once per revolution and the n per degree (when available) signals over an RF link 20 to a remote device 22, which includes a receiver circuit 24. The receiver circuit 24 may be attached to a data collector device 26, such as a stationary or portable engine analyzer, which can be used to both store and process the shaft rotation data and interpret the data to provide predictive maintenance information in a manner well known in the engine analysis art.

Figures 2, 3:
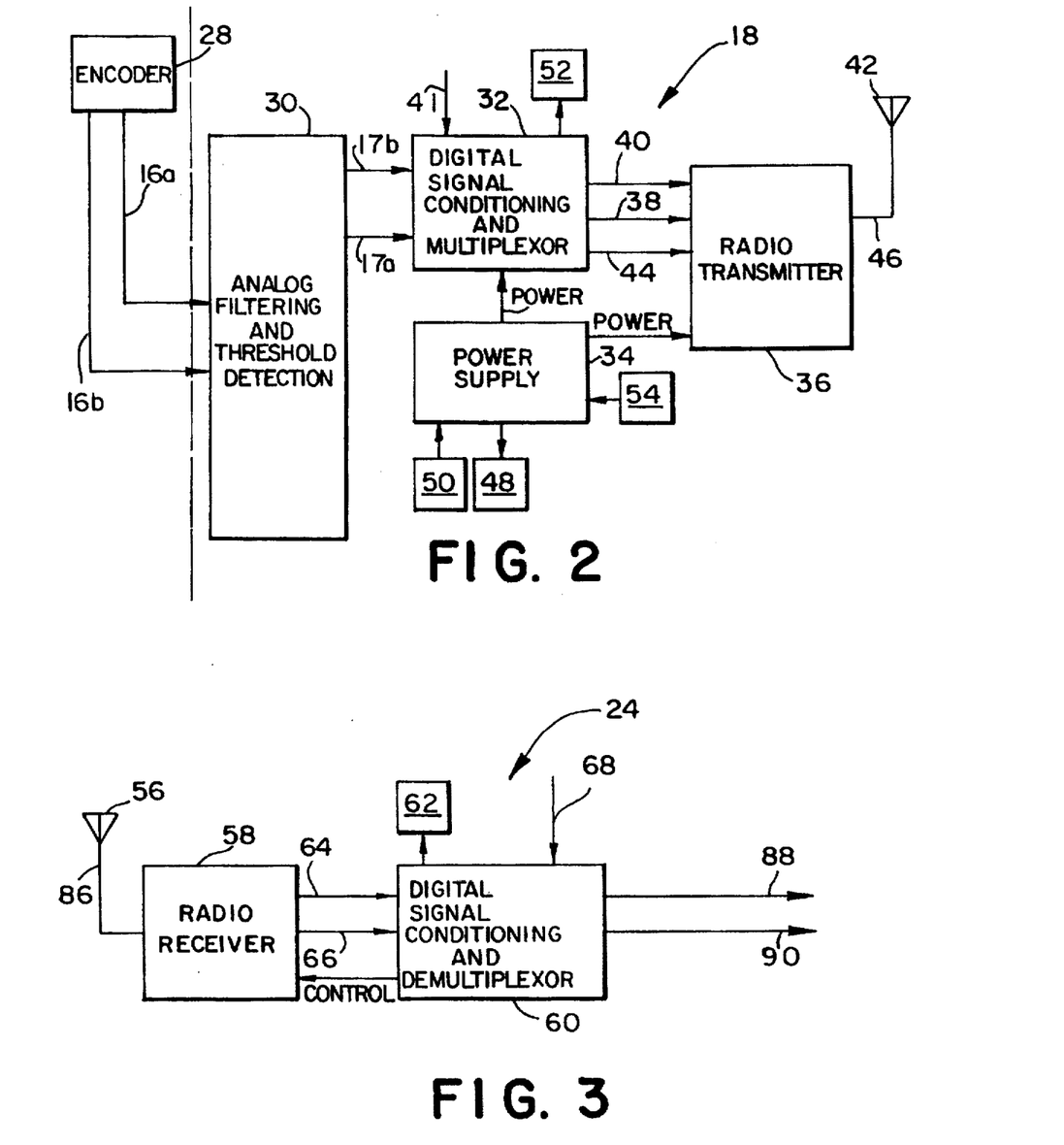
FIG. 2 is a schematic block diagram of a transmitter circuit in accordance with a preferred embodiment of the present invention.
FIG. 3 is a schematic block diagram of a receiver circuit in accordance with a preferred embodiment of the present invention.

FIG. 2 is a more detailed schematic block diagram of the transmitter 18 shown connected to an encoder 28. The encoder 28, like sensors 12a, 12b in FIG. 1, is located proximate to or connected to the engine or device 14, such as near a flywheel, for monitoring engine shaft rotation and generating the once per revolution analog signal 16a and the n per degree analog signal 16b. The encoder 28, like the sensors 12a, 12b, may comprise a magnetic or optical pick-up, a Hall effect transducer, or the like and may be either permanently or temporarily installed on the engine or device 14. If a magnetic or optical pick-up is used, the analog signals (once per revolution and n per degree) 16a, 16b from the encoder 28 are conditioned using a signal conditioner, such as low pass filters, shown at block 30, prior to being further processed by the transmitter 18. In the presently preferred embodiment, the low pass filters 30 for conditioning the analog signals provided by the encoder 28 are integral with the transmitter 18. Low pass filtering is provided to attenuate ignition interference conducted along the connecting cable which conducts the signals 16a, 16b from the encoder 28 to the transmitter 18 from being interpreted by the transmitter 18 as valid data.

After the once per revolution signal 16a and the n per degree signal 16b are conditioned, the signals 16a, 16b are converted to digital logic levels. The analog signals 16a, 16b may be converted to digital signals using an analog-to-digital (A/D) converter circuit. The signals 16a, 16b generated by the encoder 28 are in the form of pulses, where the desired information is the fact that a pulse has occurred and when in time the pulse occurred, with the amplitude of the pulse being somewhat less important. Accordingly, it is presently preferred that the signals 16a, 16b are converted to digital signals 17a, 17b by a threshold detection circuit, shown at 30, prior to further signal processing. Thus, at block 30, the analog signals 16a, 16b are conditioned and converted to corresponding digital signals 17a, 17b. It is understood that a single cable may be used to conduct both the once per revolution signal 16a and the n per degree signal 16b from the encoder 28 to the analog filter and threshold detector block 30. It is also understood that A/D conversion or threshold detection could also be performed by the sensor, and thus, would not need to be performed again by the transmitter 18.

In addition to providing low pass filtering and threshold detection, the block 30 may also include an optional circuit for skipping every other once per revolution input pulse 16a provided by the encoder 28. This optional circuit may be enabled by a user, for instance, when analyzing a four cycle engine that takes two revolutions per analysis cycle.

The transmitter 18, in addition to the analog filtering and threshold detection module 30, includes three main functional modules, a digital signal conditioning module 32, a power supply module 34, and a radio transmitter module 36. The digital signal conditioning module 32 contains a clock generator circuit and a multiplexer circuit. The clock generator circuit generates an internal clock signal. The multiplexer circuit aligns and combines the once per revolution and n per degree digital signals 17a, 17b into a single transmit data signal. The multiplexed signal, i.e. the single transmit data signal, is then used to modulate the internal clock signal, thereby generating a modulated clock signal, shown at 44. In the presently preferred embodiment, the clock generator circuit generates a 3 MHz clock signal, such that the modulated clock signal 44 provided to the radio transmitter module 36 is a 3 MHz signal. The clock signal 44 is then used by the radio transmitter module 36 to modulate a radio frequency (RF) carrier using wide band frequency modulation (FM).

Multiplexing the n per degree signal 17b and the once per revolution signal 17a enables a single RF channel to be employed for transmitting both types of data simultaneously. However, combining the once per revolution and n per degree signals 17a, 17b is difficult due to high levels of jitter introduced into the signals 17a, 17b by the engine 14 and the encoder 28. The two signals 17a, 17b are combined by a multiplexer circuit in the digital signal conditioning module 32. In the presently preferred embodiment, the signals 17a, 17b are combined by dropping one pulse (or edge) of the n per degree signal 17b during the 360 degree rotation. The occurrence of the dropped pulse signifies the occurrence of the once per revolution pulse. The missing pulse is then regenerated by the receiver circuit 24 based on its extrapolated time of occurrence. Thus, the location of the falling edge of the n per degree signal is important. Where (in time) the once per revolution pulse occurs with respect to the n per degree signal 17b is preserved.

Other methods of multiplexing the n per degree signal 17b and the once per revolution signal 17a to generate the transmit data signal could also be used. For instance, additional information could be added to every pulse of the n per degree signal 17b to indicate the occurrence of the top dead center position. However, this method would require double the transmission bandwidth and would decrease the signal-to-noise ratio at the receiver input. It is also known that the n per degree signal 17b and the once per revolution signal 17a could be simultaneously transmitted over separate RF channels, thus avoiding the need for a multiplexer. However, this method would require additional electronic circuitry, which would increase the cost of designing and manufacturing the apparatus 10.

The digital signal conditioning module 32 also generates a data signal, indicated at 40, which is provided to the radio transmitter module 36 and used by a phase locked loop (PLL) or synthesizer circuit in the radio transmitter module 36 to set the radio frequency channel used by the radio transmitter 18. The data signal 40 is derived by reading a channel selection switch 41 and calculating the divide coefficients required to achieve the desired frequency. The channel selection switch 41 is provided for allowing a user to vary, change, or set the transmit channel frequency. In the presently preferred embodiment, the channel selection switch 41 comprises a dual-in-line switch, which allows selecting one of sixteen different channels. Also in the presently preferred embodiment, the transmit channel frequency is in the range from 902 to 928 MHz.

The digital signal conditioning module 32 further provides a control signal, indicated at 38, to the radio transmitter module 36. The control signal 38 actually represents both a clock signal and an enable signal which are provided to the radio transmitter module 36 for controlling the clocking of the channel data signal 40 transmitted from the digital signal conditioning module 32 to the radio transmitter module 36. The clock signal of the control signal 38 is used to clock in the channel data signal 40 and the enable signal of the control signal 38 indicates that the data is to be loaded (i.e. the correct number of bit has been clocked in and may now be loaded), to change the transmit channel frequency of the transmitter 18.

The radio transmitter module 36 then uses the modulated clock signal 44 to generate an RF carrier signal, indicated at 46, using the PLL or synthesizer circuit. The PLL circuit is phase locked to the modulated clock 44 and converts the 3 MHz modulated clock signal 44 to a signal in the 902–928 MHz range by multiplying up the modulated clock signal 44.

The shaft position information desired to be transmitted has a spectral content varying from a fraction of 1 Hz up to 20 kHz. Accordingly, conventional modulation techniques are not employed because such techniques are limited to a lower limit of 10–100 Hz. In the presently preferred embodiment, the transmitter module 36 employs wide band frequency shift keying (FSK) modulation in order to provide some noise immunity.

The modulated RF carrier signal 46 is then bidirectionally filtered using a bandpass filter (not shown) and output to a connectorized antenna 42. The bidirectional filtering, in conjunction with band limiting the antenna 42, prevents spurious output signals from the transmitter 18 while also limiting the amount of ignition energy which can penetrate and perturb the transmitter 18. The shaft position information transmitted by the antenna 42 is spread over a wide bandwidth. The radio frequency carrier bandwidth provided in the preferred embodiment is on the order of 200 kHz, which allows for one degree of resolution on a 2400 rpm engine and the use of frequency modulation with a substantial modulation index. In the presently preferred embodiment, the RF link 20 comprises a 200 kHz wide channel in the 902–928 MHz band at a transmit power of approximately 0.75 mW. On the receive side, this permits integrating filters to be employed which have the effect of filtering noisy spikes while only slightly degrading the desired signal.

Of course, other radio channels could also be used. For instance, a 200 kHz channel in the 2400–2483.5 MHz band is also suitable. As previously discussed, the channel selection switch 41 is provided for varying or changing the transmit channel and, in the presently preferred embodiment, allows selecting one of sixteen different channels, with each channel being separated by approximately 1.6 MHz. The preferred embodiment of the present invention complies with the limits set for radio frequency energy under United States Federal Communication Commission (FCC) rules Part 15.249 and under Industry Canada regulations RSS-210.

The digital signal conditioning module 32 also includes an indicator 52 for notifying a user when the transmitter 18 is transmitting the modulated RF carrier signal 46. In the presently preferred embodiment, the indicator 52 comprises a red light emitting diode (LED) which flashes at a predetermined rate, such as once per revolution, to indicate to a user that the transmitter 18 is correctly operating. However, it is known that other suitable indicators could be used, such as a continuously lit LED.

The power supply module 34 of the transmitter 18 provides power to the digital signal conditioning module 32 and the radio transmitter module 36 and, via an auxiliary output, power may also be supplied to a sensor. In the presently preferred embodiment, power is supplied by a battery 54 and the power supply module 34 regulates the output voltage of the battery 54. A battery power level indicator 48 is connected to the battery 54, for monitoring the battery power level and indicating to a user a low battery condition. In the presently preferred embodiment, the battery power level indicator 48 comprises a yellow LED which flashes at different rates to indicate battery condition. However, it will be understood by those of ordinary skill in the art that other notification means may be provided for indicating the battery power level, such as an analog or digital power level indicator, other types of visual indicators, and/or an audible indicator.

Rather than require an ON/OFF switch, the power supply module 34 automatically senses the presence of a valid sensor and powers on the digital signal conditioning module 32 and the radio transmitter module 36. When no sensor or encoder is connected to the transmitter 18, the transmitter 18 is in an idle state and requires less than 1 mA of current. When a valid sensor is connected to the transmitter 18, the power supply module 34 restores power to the digital signal conditioning module 32 and the radio transmitter module 36. In addition, the power supply module 34 automatically shuts down the digital signal conditioning module 32 and the radio transmitter module 36 whenever a low battery voltage level condition is encountered. In order to recharge the battery 54 and/or reactivate the transmitter 18, a battery charger circuit and input jack 50 are provided. The transmitter 18 reactivates itself and exits a shut down mode by sensing an input in the charger jack 50. The battery charger circuit allows the battery 54 to be recharged at a rapid rate until a predetermined voltage level is reached, at which time, the battery 54 is recharged at a maintenance rate. In addition, to protect the battery 54, power up of the transmitter 18 is disabled until the charger is plugged in. The battery 54 may be recharged by connecting an AC adapter of a type well known by those of ordinary skill in the art. The battery 54 is capable of supplying the digital signal conditioning module 32 and the radio transmitter module 36 for at least 8 hours on a single charge. In addition, the power supply module 34 may supply a sensor with 5 volts at up to 75 mA. A commercially available battery which is capable of providing a sensor and the transmitter 18 with power is a 6 volt lead acid type battery. However, it will be understood by those of ordinary skill in the art that other batteries may be employed.

The transmitter 18 of the present invention further includes a built-in self-test mode. In the built-in self test mode, a test pulse is output every 10 seconds and shown on the indicator LED 48 if the encoder 28 is connected to the transmitter 18 but is not operational. The test pulse output can also be shown on the remote device 22. The test pulse output is also provided if the encoder 28 has been removed from the rotating device 14 but is left connected to the transmitter 18.

In the presently preferred embodiment, the transmitter 18 is designed to be rugged and durable, in order to tolerate the harsh conditions in which it operates. For instance, the transmitter 18 is designed to survive a one meter drop onto concrete with only cosmetic damage. The transmitter 18 is also designed to withstand water penetration, such as from a dripping or leaking pipe, or a spilled beverage. The transmitter 18 is further designed to survive vibration, as is typically caused by large rotating devices.

Figure 4A:
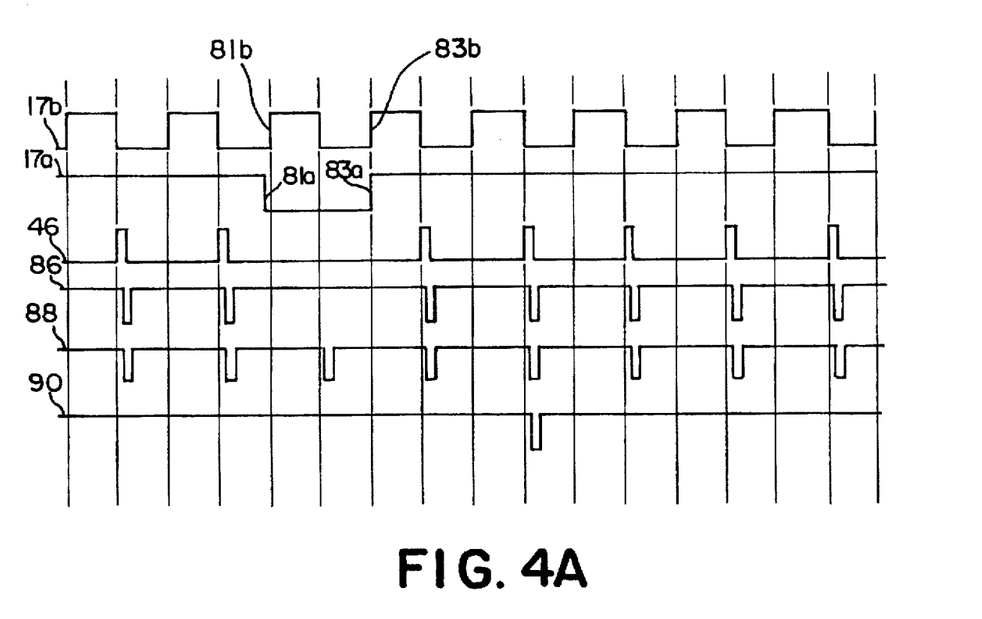
FIG. 4A is a timing diagram of a once per revolution signal and an "n" per degree signal generated by a sensor, transmitted over an RF link, and received by a receiver in accordance with a preferred embodiment of the present invention.

FIG. 4A illustrates the change in wave forms as the once per revolution and n per degree digital signals 17a, 17b, shown as a series of pulses, are processed, transmitted, received, and reconstructed. Only an ideal wave form is illustrated. In the presence of noise, the apparatus 10 filters out the noise, determines correct pulses, and reconstructs contaminated pulses.

The n per degree signal 17b goes low at specific degree increments, normally, but not restricted to n per degree of engine shaft rotation, with a minimum pulse duration of 30 uSec. In the presently preferred embodiment, the encoder 28 can provide between 36 and 2,880 pulses per revolution, with a minimum pulse frequency of 9 pulses per second. Thus, for every one degree of rotation, the encoder 28 can produce a pulse of 50 percent duty cycle. That is, 360 rising edges and 360 falling edges are produced each revolution (where n=1). The once per revolution signal 17a goes low every fixed number of n per degree marks and stays low for between 30 uSec and 2 seconds. Thus, for each rotation of the engine shaft, the encoder 28 produces a pulse having one rising edge and one falling edge. As illustrated in FIG. 4A, the once per revolution pulse 17a goes low 81a at a rising edge 81b of one of the n per degree pulses and remains low until the next rising edge 83b of the n per degree signal 17b, as shown at 83a. The modulation on the RF carrier signal 46 is represented by wave form 84 in FIG. 4A. Note that the wave form 84 illustrates a dropped pulse, indicating the occurrence of a once per revolution pulse 17a.

Figure 4B:
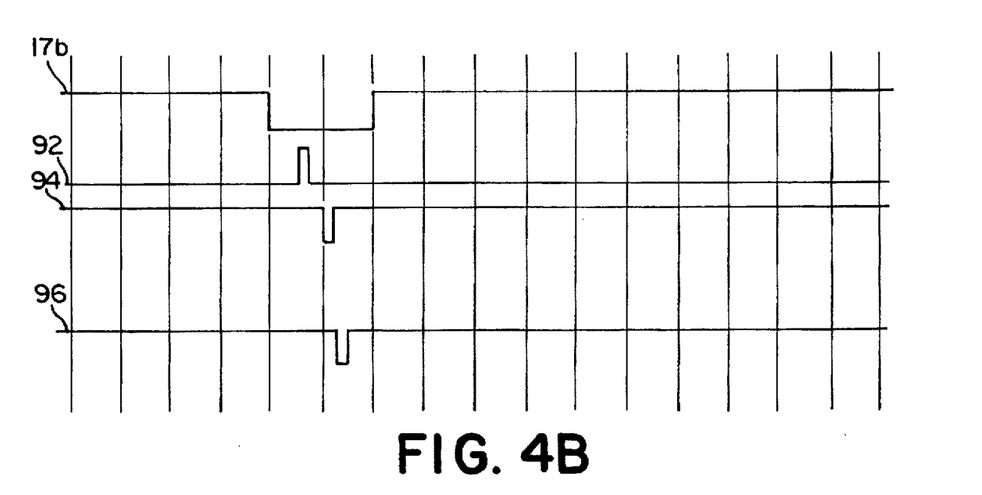
FIG. 4B is a timing diagram of a once per revolution signal generated by a sensor, transmitted over an RF link, and received by a receiver in accordance with a preferred embodiment of the present invention.

FIG. 4B illustrates the change in wave forms when only the once per revolution digital signal 17a is transmitted by the transmitter 18 and received and reconstructed by the receiver circuit 24. Wave form 92 illustrates the modulation on the RF carrier signal transmitted over the RF channel by the transmitter 18 when only the once per revolution digital signal 17a is detected by the encoder 28. It will be appreciated that the timing shown in FIGS. 4A and 4B is not guaranteed, but is just an example.

The modulated RF carrier signal 46 is transmitted over the RF link 20 and is intercepted by the remote device 22. By remote, it is meant that the device 22 is spaced from the encoder 28. In a typical application, the encoder 28 is affixed to a large engine, the transmitter 18 is connected to the encoder 28 via a short cable, and the remote device 22 is spaced from the encoder 28 and the transmitter 18. However, the remote device may still be proximate to the engine, since the type of engines monitored are often very large. Thus, remote, as used in the present application, does not necessarily connote that the device 22 is a great distance from the engine or machine being tested or analyzed. As shown in FIG. 1, the remote device 22 includes the receiver circuit 24 and the data collector device 26, such as an engine analyzer.

Referring now to FIG. 3, the receiver circuit 24 is shown in greater detail. The receiver circuit 24 includes an antenna 56 for receiving the modulated RF carrier signal 46 radiated by the transmit antenna 42. The received RF carrier signal is indicated at 64. The receiver circuit 24 also includes a radio receiver module 58 to select, filter and demodulate the received signal 64, and a receiver digital signal conditioning and demultiplexing module 60. The radio receiver module 58 receives the signal 64 from the antenna 56 and demodulates the signal 64. The demodulated received RF carrier signal is indicated at 86 in FIGS. 3 and 4A, and at 94 in FIG. 4B.

Due to the fact that high voltage ignition wires are often in very close proximity, often inches, of the receiver 22, the receive antenna 56 is a band limited antenna. In addition, the radio receiver module 58 includes a bandpass filter to filter the received signal 64 to prevent spurious outputs from the receiver circuit 24 and to limit the amount of ignition energy entering the receiver circuit 24.

The radio receiver module 58 comprises a conventional double down conversion architecture and discriminator to detect the modulated carrier of the received data signal 64. The wide band frequency modulation employed permits a substantial signal to noise gain through the demodulation process, thereby significantly attenuating ignition pulses with respect to the desired signal. The demodulated signal 86, representing the multiplexed n per degree and once per revolution signals 17b, 17a transmitted over the RF link 20, is provided to the receiver digital signal conditioning module 60 by the radio receiver module 58. In addition, the radio receiver module 58 provides the receiver digital signal conditioning module 60 with a received signal strength indication signal (RSSI) 66.

The receiver digital signal conditioning module 60 includes a digital signal processor for reconstructing the n per degree signal 17b and the once per revolution signal 17a, and generating corresponding reconstructed signals 88 and 90, respectively, for use by the data collector 26. In the case where the RF carrier signal 46 includes only once per revolution signal information, the reconstructed pulse is shown at 96 in FIG. 4B.

The ignition pulses from the engine 14, however, can be so large in magnitude that they may still be superimposed on the received signal 64 whenever the receiver 22 is close to the engine ignition wires. Thus, in order to further mitigate the potential for interference, the digital signal conditioning module 60 employs a processor which uses constantly updated predictions of the characteristics of both the engine rotation and of the ignition pulses. In the presently preferred embodiment, the digital signal conditioning module 60 employs a Motorola® type HC6811 processor. However, it will be understood by those of ordinary skill in the art that other processors, such as a digital signal processor, could be used. The processor is programmed according to the assumptions described below in accordance with the state table shown in FIG. 5.

It is known that the engine 14 accelerates and decelerates at certain predetermined maximum rates. It is further known that the encoder 28 in combination with the engine 14 experiences torsional vibration and jitter at some level. Finally, it is known that the encoder 28 does not change its data format while the RF link 20 is established and operating normally. These inferences are used to program the processor within the receiver 20 to qualify the incoming data signal 86 and filter out pulses which are not valid. This information is further used to allow the receiver digital signal conditioning module 60 to reconstruct pulses which have become contaminated or distorted. However, if the receiver digital signal conditioning module 60 determines that a signal contains errors which cannot be corrected, an indicator 62 is provided for notifying the user of such an uncorrected error condition. In the presently preferred embodiment, a visual indicator 62, such as a flashing LED is disposed on the receiver circuit 24. However, it is within the scope of the present invention that other means of notifying a user of an uncorrectable error condition may be used, such as an audible alarm or an audible alarm in conjunction with a visual alarm. In the presently preferred embodiment, the indicator 62 is turned off to indicate the integrity of the received signal 64 and is turned on if an error condition is detected. The indicator 62 is also turned off once data integrity has been restored.

Figure 5:
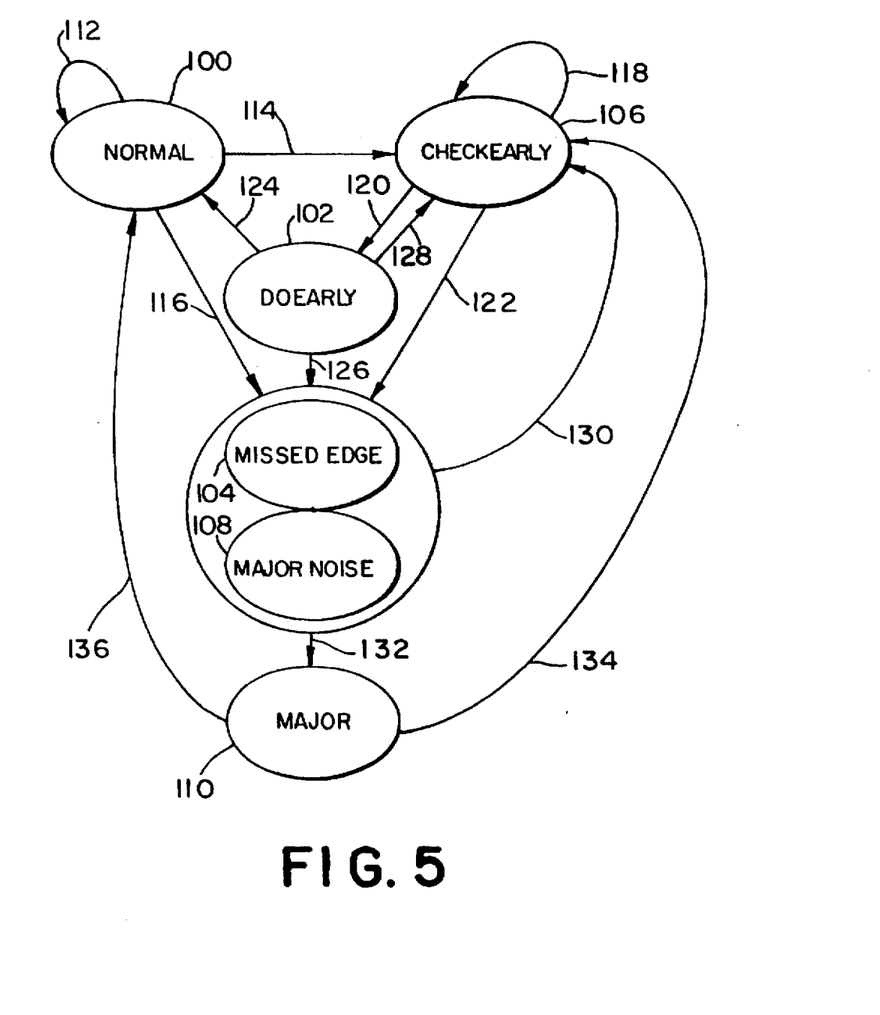
FIG. 5 is a state diagram of a method of processing signals in accordance with a preferred embodiment of the present invention.

FIG. 5 is a state diagram which, along with the event table below, illustrates a time windowing process implemented using the processor in the digital signal conditioning module 60 for detecting and correcting the shaft position information transmitted over the RF link 20. Normal, DoEarly, MissedEdge, CheckEarly, MajorNoise and Major, indicated at 100, 102, 104, 106, 108 and 110, respectively, are all different operating states. Movement from one state to another state is dependent on information determined from the location (time) of the falling edge (or lack of falling edge) of the incoming data signal 86. The state diagram applies to operation where both once per revolution (Major) pulses and n per degree (Minor) pulses are present. Before the processor has entered the Normal state 100, the processor calculates estimated times indicating when to expect both the next minor pulse and the next major pulse, respectively, during a synchronization phase. On receiving each valid minor pulse, the processor updates these estimates. Valid pulses are differentiated from invalid pulses by measuring exactly when the pulse occurs and determining whether the pulse has occurred within a valid window (i.e. estimated time range). The formulas for determining these windows are illustrated in the event table below. With no errors, only the Normal, MissedEdge and Major states 100, 104, and 110 are executed. The other states, DoEarly 102, CheckEarly 106, and MajorNoise 108 are executed to help detect and correct errors.

The Normal State

Beginning at the Normal state 100, if a Major (i.e. a once per revolution pulse) is not expected, then the processor waits for the next pulse to occur. Pulses (i.e. data signal 86) are accepted from the radio receiver 58, checked to determine if they occur at the expected time by comparing the arrival time of the pulse 86 to the estimated arrival time, and output with a fixed delay as either an n per degree signal 88 or a once per revolution signal 90 to the data collector device 26. In addition, the estimates for when the next pulse should arrive are updated. If the next pulse occurs within the time estimated for the arrival of the next pulse, the processor remains in the Normal state 100, as indicated by an EdgeOK event 112. If a pulse occurs unexpectedly early, as compared to the estimated time of arrival for the next pulse, the processor exits the Normal state 100 and enters the CheckEarly state 106 via event 114. If a Major pulse is expected and no transition (i.e. a change in state of the pulse from high to low or low to high) occurs, as expected, the MissedEdge state 104 is entered via event 116. However, if a transition does occur, the MajorNoise state 108 is entered, also via event 116. Detecting a transition outside the permitted window may indicate that either a noise spike has occurred or the processor miscalculated when the next pulse should occur. Thus, the Normal state 100 is exited if the software timer indicates that a Major pulse is expected, a pulse arrives unexpectedly early, or no pulse occurs for 5 seconds. In the latter case, a watch dog timer resets the processor.

The CheckEarly State

In the CheckEarly state 106, the processor assumes that either the arrival time of the previous pulse was estimated incorrectly or that a noise spike occurred. The CheckEarly state 106 assumes that it is unlikely that two adjacent noise spikes will be received, and therefore widens or makes larger the time window in which a pulse is expected to be received. If a subsequent pulse also is received early, the processor remains in the CheckEarly state 106, as indicated by an EarlyEdge event 118. If a subsequent pulse occurs within the predicted time window, then the CheckEarly state 106 is exited and the processor enters the DoEarly state 102, as indicated by an EdgeOK event 120. If a Major pulse is expected, as indicated by the software timer, and no transition occurs, then the processor enters the MissedEdge state 104, and if a Major pulse is expected and a transition is detected, then the processor enters the MajorNoise state 108, assuming that either a noise spike has occurred or the receiver has miscalculated where the Major pulse should occur.

The DoEarly State

The DoEarly state 102 is entered only from the CheckEarly state 106 when a pulse arrives within the predicted, enlarged time window, but before accepting new estimation parameters, as indicated by event 120. In the DoEarly state 102, the processor ensures that the new estimation parameters are in accordance with the next received pulse, before updating the estimation parameters. The DoEarly state 102 exits to the Normal state 100, if a second pulse is received during the modified window, as indicated by event 124 and exits to the CheckEarly state 106 if the second pulse arrives early, as indicated by event 128. If the software timer indicates that a Major pulse is expected and no transitions occur, the processor enters the MissedEdge State 104 through event 126. If the software timer indicates that a Major pulse is expected and a transition is detected, then the processor enters the Major Noise state 108, as indicated by event 126, based on the assumption that either a noise spike has occurred or the processor has miscalculated where the Major pulse should occur.

The Missed Edge State

As previously discussed, the MissedEdge state 104 is entered from the Normal state 100, the DoEarly state 102 or the CheckEarly state 106 when a Major pulse is expected and no pulse occurs. It should be recalled that when a Major pulse is expected and no pulse occurs, this signals that the Major pulse did indeed occur, according to the means described for multiplexing the once per revolution and n per degree signals 17a, 17b. Because no transition occurs, none of the estimation parameters are updated. The MissedEdge state 104 is exited if either a pulse is received correctly or a pulse is received early. If a pulse is received early, the processor enters the CheckEarly state 106, as indicated at event 130, and if the pulse is received correctly, the processor enters the Major state 110, as indicated at line 132. The Major pulse 90 is output from the receiver digital signal conditioning module 60 at the time the Major pulse was expected, and none of the estimation parameters are updated.

The Major Noise State

The MajorNoise state 108 is entered when a Major pulse is expected and a pulse actually occurs. The processor assumes that the received pulse is noise, since according to the manner in which the once per revolution and n per degree signals 17a, 17b are multiplexed, no pulse is expected at this time. An error counter in the processor is incremented, the Major pulse 90 is output from the receiver digital signal conditioning module 60 at the time the Major pulse was expected, and none of the estimation parameters are updated. The MajorNoise state 108 is exited either when a subsequent pulse is received correctly or early. If the subsequent pulse is received earlier than expected, then the processor proceeds to the CheckEarly state 106 as indicated at event 130 and if the subsequent pulse is received within the estimation parameters, the processor proceeds to the Major state 110, as indicated at event 132.

The Major State

The Major state 110 is entered after a Major pulse should have or did occur. The Major state 110 is distinct from the Normal state 100 only in that the estimation parameters are derived from taking an average of the previous two intervals (one of which should have been a Major). The Major state 110 is always exited after a pulse is received. If the subsequent pulse is received correctly, the processor proceeds to the Normal state 100, as indicated by an EdgeOK event 136 and if the subsequent pulse is received early, the processor proceeds to the CheckEarly state 106, as indicated by an EarlyEdge event 134.

The Event table below shows how the processor calculates the time windows or pulse estimation parameters for each state of the transition table (FIG. 5). OK for "Previous Pulse" and "Current Pulse" indicates that the pulse was received within the expected time window, "X" indicates a don't care condition, "Early" indicates that the pulse occurred early, and "Major" indicates that the pulse was a major pulse.

The "Intervals" column indicates the current value of the time variables set in the processor relating to when the next pulse is expected and whether and how the variable is updated. In the presently preferred embodiment, there are two parameters, "Expected" and "Early". "Expected" is the expected time interval between pulses and "Early" is the lower limit for the interval. For instance, in the Normal state 100 (the first row of the table), the Early variable is 0.875 times the Expected variable. As another example, in the CheckEarly state 106 (row 2), "Expected=no change" indicates that the Expected variable is not updated or changed (because the reason the current pulse was early has not been determined).

The "Windows" column indicates the time window in which the next pulse is expected. "OK" in the Windows column indicates the time at which the current pulse occurred. For example, in the Normal state 100 (row 1), the time window in which the next pulse is expected is bound by the Right and Left parameters, which is the time at which the current pulse occurred plus the time interval between the current pulse and the previous pulse (i.e. expected interval) +/−12.5%.

The apparatus 10 is unique in its ability to transmit both once per revolution and n per degree information simultaneously, in real-time, and in an electronically noisy environment, to a remotely located data collector and/or analyzer 26. Although the preferred embodiment of the apparatus 10 of the present invention is described herein with reference to connecting an engine analyzer 26 to an encoder 28 on a large reciprocating machine, it will be appreciated that such reference to machines is provided for illustrative purposes only and is not limiting. The apparatus 10 of the present invention is well suited for use in many other types of applications, and more particularly, has application in any area in which the wireless transmission of electrical signals in the vicinity of impulsive, electromagnetic energy is desired to perform a communication function. For example, the apparatus 10 can be used in any harsh electrical environment where it is difficult to run cables or otherwise communicate with a sensor. Other useful applications of the present invention will also be apparent to those skilled in the art.

Accordingly, it will be appreciated that changes and modifications may be made to the above described embodi-

Event Table

| Previous Pulse | Current Pulse | State | Intervals | Windows (1) |
|---|---|---|---|---|
| OK | OK | Normal | Expected = current<br>Early = 0.875 × expected | Right = OK + 1.125 expected<br>Left = OK + Early |
| X | Early (3) | CheckEarly | Expected = no change<br>Early = 0.5 × expected | Right = Expected + 1.125 expected<br>Left = Expected + Early |
| Early | OK | DoEarly | Expected = no change<br>Early = no change | Right = OK + 1.125<br>Left = OK + Early |
| X | Major (2,4) | MissedEdge<br>MajorNoise | Expected = no change<br>Early = no change | Right = Major + 1.125<br>Left = Major + Early |
| Major | OK | Major | Expected = average last 2<br>Early = 0.875 × expected | Right = OK + 1.125 expected<br>Left = OK + Early |

NOTES:
1. In the Windows column OK, Early, and Major indicate the time when the OK, Early or Major pulses occurred.
2. If the current pulse is Major, there is insufficient information to change the window.
3. The expected interval is not updated when an early pulse occurs, however the early interval is changed.
4. When the current pulse should be a Major (no pulse) and there is no pulse, then the current pulse is processed as a missed edge. If there is a pulse, then it is processed as MajorNoise.

The receiver digital signal conditioning module 60 further includes a channel selection switch 68, which corresponds to the transmitter digital signal conditioning module channel selection switch 41, so that the transmitter 18 and the receiver circuit 24 are tuned to transmit and receive over the same frequency band.

As previously discussed, the receiver circuit 24 is electrically connected to a data collector device 26, such as a portable engine analyzer. In the presently preferred embodiment, the data collector device 26 is a RECIP-TRAP® engine and compressor monitoring system available from Beta Monitors & Controls, Ltd. of Calgary, Alberta, Canada. The data collector device 26 provides digital data acquisition and comprehensive machinery analysis for determining detailed engine information, such as cylinder signatures and vibration analysis.

Like the transmitter 18, the presently preferred embodiment of the receiver circuit 24 is constructed to be rugged and durable, in order to tolerate the harsh conditions in which it operates. For instance, the receiver circuit 24 is designed to withstand a one meter drop onto concrete with only cosmetic damage, water penetration, such as from a dripping or leaking pipe, or a spilled beverage, and vibration, as is typically caused by large rotating devices.

ment without departing from the inventive concept thereof. Therefore, it is understood that the present invention is not limited to the particular embodiment disclosed, but is intended to include all modifications and changes which are within the scope and spirit of the invention as defined by the appended claims.

We claim:

1. A radio frequency (RF) apparatus for transmitting real-time shaft position information over an RF channel between at least one sensor located proximate to a rotating machine and a receiver, in the presence of high voltage electromagnetic impulses, the at least one sensor monitoring a rotating shaft of the rotating machine and generating a once per revolution analog signal and an n per degree analog signal, the apparatus comprising:
  (a) a transmitter for processing and transmitting the analog signals generated by the at least one sensor, the transmitter comprising:
    (i) a threshold detection circuit for converting the analog signals to corresponding digital logic signal levels;
    (ii) a multiplexer for combining the once per revolution and n per degree digital signals into a single transmit data signal representing the once per revolution signal and the n per degree signal;

(iii) a modulator for modulating a reference clock with the transmit data signal;

(iv) a radio frequency synthesizer electrically connected to the modulator for generating a radio frequency carrier using the modulated reference clock; and (v) an antenna electrically coupled to the synthesizer for radiating the modulated radio frequency carrier signal; and (b) a receiver spaced from the transmitter comprising:
(i) an antenna for receiving the signal radiated by the transmitter;
(ii) a receiver circuit electrically coupled to the receiver antenna for selecting and demodulating the received signal; and
(iii) a signal processor for demultiplexing and reconstructing the once per revolution and n per degree digital signals from the demodulated received signal.

2. The apparatus of claim 1 wherein the n per degree and the once per revolution signals are multiplexed by dropping a pulse of the n per degree signal which corresponds in time with the once per revolution signal, such that the location of the dropped pulse indicates the occurrence of a once per revolution pulse, and wherein the dropped pulse is regenerated by the signal processor.

3. The apparatus of claim 1 further comprising a shielded conductor for electrically connecting the sensor to the transmitter.

4. The apparatus of claim 1 wherein the transmitter further includes a signal conditioner for conditioning the analog signals prior to presenting the analog signals to the threshold detection circuit.

5. The apparatus of claim 4 wherein the signal conditioner comprises a low pass filter.

6. The apparatus of claim 1 wherein the receiver further comprises an analyzer for utilizing the reconstructed signals to perform predictive maintenance analysis.

7. The apparatus of claim 1 wherein the modulator comprises means for performing wide band frequency shift keying (FSK).

8. The apparatus of claim 1 wherein the transmit antenna and the receive antenna each comprise a band limited antenna.

9. The apparatus of claim 1 wherein the modulator further comprises means for performing frequency modulation, and wherein a frequency reference is modulated to provide a frequency response extending to 0 Mz.

10. The apparatus of claim 1 wherein the signal processor comprises means for detecting a perturbed transmit data signal, the perturbation due to high voltage electromagnetic impulses and/or RF signal fades, and means for compensating for the perturbed transmit data signal.

11. The apparatus of claim 1 wherein the signal processor further comprises an uncorrectable error indicator for notifying a user of an uncorrectable error condition.

12. The apparatus of claim 1 further comprising a battery-powered power supply module for providing power to the at least one sensor and the transmitter.

13. The apparatus of claim 12 wherein the power supply module includes a low battery indicator for notifying a user of a low power condition.

14. The apparatus of claim 12 wherein the power supply module includes a battery recharger circuit for allowing the battery to be recharged.

15. The apparatus of claim 1 further comprising an auto powering circuit for powering the transmitter on and off.

16. The apparatus of claim 1 further comprising a switch for selecting an RF channel, wherein the transmitter is capable of transmitting data over at least two different RF channels.

17. The apparatus of claim 16 wherein one of the at least two RF channels is in a range between 902–928 MHz.

18. A radio frequency (RF) apparatus for transmitting shaft position information over an RF channel between at least one sensor connected to an engine and a receiver, in the presence of high energy ignition voltages, wherein the at least one sensor generates a once per revolution signal and an n per degree signal, the RF apparatus comprising:

(a) a transmitter for receiving and processing the once per revolution signal and the n per degree signal generated by the at least one sensor, the transmitter comprising:
(i) a multiplexer for combining the once per revolution and n per degree signals into a single transmit data signal representing the once per revolution signal and the n per degree signal;
(ii) a modulator for modulating a reference clock with the transmit data signal;
(iii) a radio frequency synthesizer electrically connected to the modulator for generating a radio frequency carrier using the modulated reference clock; and
(iv) a first antenna electrically coupled to the synthesizer for radiating the modulated carrier signal; and (b) a receiver spaced from the transmitter, the receiver comprising:
(i) a second antenna for receiving the signal radiated by the transmitter;
(ii) a receiver circuit electrically coupled to the receive antenna for demodulating the received signal; and
(iii) a processor for reconstructing the once per revolution and n per degree signals therefrom.

19. A method for transmitting shaft position information over an RF channel from at least one sensor mounted on an engine to a receiver, in the presence of high voltage electromagnetic impulses, the method comprising the steps of:

(a) monitoring a rotating shaft utilizing at least one sensor and generating a once per revolution analog signal and an n per degree analog signal;
(b) converting the analog signals to corresponding digital signals;
(c) combining the digital signals into a single, transmit data signal representing the once per revolution signal and the n per degree signal;
(d) modulating a reference clock with the transmit data signal;
(e) transmitting the modulated signal over an RF channel;
(f) receiving the transmitted signal at the receiver;
(g) demodulating the received signal; and
(h) demultiplexing and reconstructing the once per revolution and n per degree digital signals therefrom.

20. The method of claim 19 further comprising the step of error correcting the demodulated received signal.

21. A radio frequency (RF) apparatus for transmitting real-time shaft position information over an RF channel between at least one sensor located proximate to a rotating machine and a receiver, in the presence of high voltage electromagnetic impulses, the at least one sensor monitoring a rotating shaft of the rotating machine and generating a once per revolution analog signal, the apparatus comprising:

(a) a transmitter for processing and transmitting the once per revolution analog signal generated by the at least one sensor, the transmitter comprising:

(i) a threshold detection circuit for converting the once per revolution analog signal to digital logic signal levels, thereby generating a digital transmit data signal;

(ii) a modulator for modulating a reference clock with the transmit data signal;

(iii) a radio frequency synthesizer electrically coupled to the modulator using the modulated reference clock for generating a radio frequency carrier signal; and (iv) an antenna electrically coupled to the synthesizer for radiating the modulated radio frequency carrier signal; and (b) a receiver spaced from the transmitter comprising:

(i) an antenna for receiving the signal radiated by the transmitter;

(ii) a receiver circuit electrically coupled to the receiver antenna for selecting and demodulating the received signal; and (iii) a signal processor for reconstructing the once per revolution digital signal from the demodulated received signal.

* * * * *